United States Patent [19]
Chevaugeon et al.

[11] 3,737,745
[45] June 5, 1973

[54] WHEEL SLIP CONTROL SYSTEM

[75] Inventors: Rene J. Chevaugeon, Erie; Russell M. Smith, North East, both of Pa.

[73] Assignee: General Electric Company, Erie, Pa.

[22] Filed: Dec. 16, 1971

[21] Appl. No.: 208,670

[52] U.S. Cl. .................................................. 318/52
[51] Int. Cl. ............................................. B61c 15/12
[58] Field of Search .................. 290/3; 318/52, 69, 318/143, 355

[56] References Cited

UNITED STATES PATENTS

| | | | |
|---|---|---|---|
| 3,183,422 | 5/1965 | Stamm | 318/52 |
| 3,560,816 | 2/1971 | Franzen | 318/52 |

*Primary Examiner*—Bernard A. Gilheany
*Assistant Examiner*—W. E. Duncanson, Jr.
*Attorney*—Charles W. Helzer and Walter C. Beinkopf

[57] ABSTRACT

A wheel slip control system for electric traction motor drives using series type direct current traction motors having the field and armature windings connected in series electrical circuit relationship and generally employed in connection with electrically driven vehicles such as electric locomotives and the like. The wheel slip control system comprises a wheel slippage detector in the form of a measuring bridge, tachometer or the like for detecting slippage of any one of a number of series type direct current traction motors employed in driving the vehicle and deriving an output indication of any slippage. An auxiliary source of direct current is connectable to the series connected field-armature circuit of the respective series type traction motors in parallel with and in addition to the normal direct current excitation connections to the traction motor. The polarity of connection of the auxiliary direct current source is such that the armature current of the traction motor is reduced upon the auxiliary direct current excitation being supplied with a consequent reduction in the tractive effort of the traction motor. The connection preferably is in aiding relation across the field winding of the traction motor in which event the auxiliary current is added to and aids the normal excitation current. The value of the auxiliary current is adjusted to maintain total field current of the series type motor at the same or higher value than it was prior to slippage. As a consequence the back EMF of the motor is increased due to the slippage thereby reducing the armature current and the tractive effort of the motor to correct the slippage. A wheel slip control circuit also is provided which is responsive to the wheel slippage detector and controls the connection of the auxiliary source of direct current to the field-armature circuit of the series type traction motor for achieving the desired reduction in tractive effort upon detection of a slippage condition.

12 Claims, 10 Drawing Figures

WHEEL SLIP CONTROL SYSTEM

BACKGROUND OF INVENTION

FIELD OF INVENTION

This invention relates to a new and improved wheel slip control system.

More particularly, the invention relates to a system for controlling slippage of series type direct current traction motors used on electrically driven vehicles such as electric locomotives, and which provides for selective reduction in the tractive effort of any one of a plurality of series type direct current traction motors used to power the vehicle in order to overcome slippage of that motor without requiring that the tractive effort of nonslipping motors be reduced.

BACKGROUND PROBLEM

Wheel slip control systems used on electric and diesel-electric locomotives, except for those equpped with shunt type direct current traction motors, usually correct wheel slip by reducing the power supplied from a common power source to the traction motors on all axles of the vehicle. There are some alternative schemes for partial correction, such as the use of crossties between two paris of serially connected motors, or the use of field weakening on predetermined motors. These have not been too satisfactory in service, however, and for the most part wheel slip correction is usually accomplished by controlling the excitation of the field of the power generator used to supply the DC traction motors. The power generator output generally is controlled for other purposes (such as speed control) and an additional wheel slip control readily can be included to the alternator field control circuit for wheel slip control purposes. For a description of such an overall control system, reference is made to a series of articles appearing in the "Railway Locomotives and Cars" magazine parts 9 through 15 published between May 1966 and January 1968. This series of articles was written by Robert K. Allen of the General Electric Company's Transportation Systems Division, and parts of the articles have been reprinted in booklet form, and are available from the Railway Locomotives and Cars – 30 Church Street, New York, N.Y. 10007. Although this known technique corrects wheel slip, it also results in reduction of the total tractive effort of all of the traction motors including those which are not slipping. Quite obviously, if only one axle slips, and the power to it only is reduced in order to correct this wheel slippage, then the total tractive effort of the locomotive will be higher during the correction period because the non-slipping motors are continuing to exert maximum tractive effort. Accordingly, an improvement in total pulling capability (adhesion) of the locomotive can be made if correction of wheel slip is made by reducing power to only the slipping motor, and allowing the non-slipping motors to continue to operate at full tractive effort.

There are a number of known wheel slip control systems for use with electric locomotives which employ "shunt" type direct current traction motors wherein the field winding of the mtoor is connected toa separately controllable DC supply. With shunt type motors, it is possible to control wheel slip by individually adjusting the shunt field of each traction motor. With these known systems, if one axle slips, the power to the slipping shunt type motor can be reduced to correct the wheel slip without reducing the total tractive effort of the remaining shunt type connection motor so that the total tractive effort of the locomotive is higher during the period while slippage is corrected because the non-slipping motors are continuing to exert maximum tractive effort. However, shunt type traction motors do not possess certain desirable operation characteristics inherent in the series type traction motor wherein the field winding and armature of the motor are connected in series electrical circuit relationship. These desirable operating characteristics such as high starting torque and resistance against flash-over are inherent advantages in the series type motor which it is desirable to retain. Accordingly, it is an object of this invention to secure the benefits of wheel slip control for the individual traction motors while still retaining the inherent advantages of the series type traction motor.

SUMMARY OF INVENTION

It is therefore a primary object of the present invention to provide a new and improved wheel slip control system for controlling slippage of individual series type direct current traction motors in a manner which provides selective reduction in the tractive effort of any one individual series type direct current traction motor in order to overcome slippage of that motor without requring that the tractive effort of non-slipping motors be reduced.

In practicing the invention a wheel slip control system is provided that includes an auxiliary source of direct current that can be separately fed to any of the series wound traction motors that are detected to be slipping, and which is in addition to the normally supplied series direct current excitation. The auxiliary direct current preferably is supplied in aiding relation to the series connected field winding of the series type traction motor so that when wheel slip occurs, power is fed from this source into the field of the slipping motor, thus increasing the back EMF and reducing the armature current. Reduction of the armature current in this manner accordingly results in a reduction of the tractive effort of the motor. For example, if the field current of the series type traction motor is maintained at a value equal to that used before the slipping started, then it is possible to bring the armature current, hence the motor torque (tractive effort), to zero within the voltage range of the traction motor armature resistance and armature reaction. In effect, this provides to the normal series type traction motor all the benefits of a shunt motor (in so far as correcting wheel slip is concerned) while retaining the advantages of the series motor as far as resisting flash over and high starting torque, is concerned.

A feature of the invention is the provision of a new and improved wheel slip control system for electric traction motor drive employing series type direct current traction motors and which comprises wheel slippage detecting means for detecting slippage of individual ones of the series type direct current traction motors and deriving an output indication of any such slippage. An auxilary source of direct current is connectable to the series connected field-armature circuits of the individual series type traction motors in parallel with and in addition to the normal direct current excitation source for the traction motors. The polarity of the connection of the auxiliary direct current source is such that the armature current of the traction motor is reduced with a consequent reduction in the tractive effort of the motor. The system is completed by wheel slip control means responsive to the wheel slippage detecting means and controlling connection of the auxiliary source of direct current to the field-armature circuit of the series type traction motor. The traction motors may be connected in series, series-parallel, or parallel circuit relationship and the wheel slip control system may be tow to control tow or more motors concurrently as will be described more fully hereinafter. Alternatively, the traction motors may be separately excited by individually associated wheel slip control systems. The auxiliary source of direct current may comprise a battery, a voltage divider connection, an alternating current source supplying a rectifier and switched into circuit relationship through a thyristor device such as a silicon control rectifier. Additionally, phase control of the value of the auxiliary current can be provided to thereby achieve a finely controlled and fast responding correction of a detected slippage condition. The wheel slippage detector may comprise any known form that operates either electrically or electromechanically through the medium of a tachometer.

BRIEF DESCRIPTION OF DRAWINGS

These and other objects, features and many of the attendant advantages of this invention will be appreciated more readily as the same becomes better understood by reference to the following detailed description, when considered in connection with the accompanying drawings, wherein like parts in each of the several Figures are identified by the same reference character, and wherein.

DETAILED DESCRIPTION OF PREFERRED EMBODIMENTS

Figure 1:
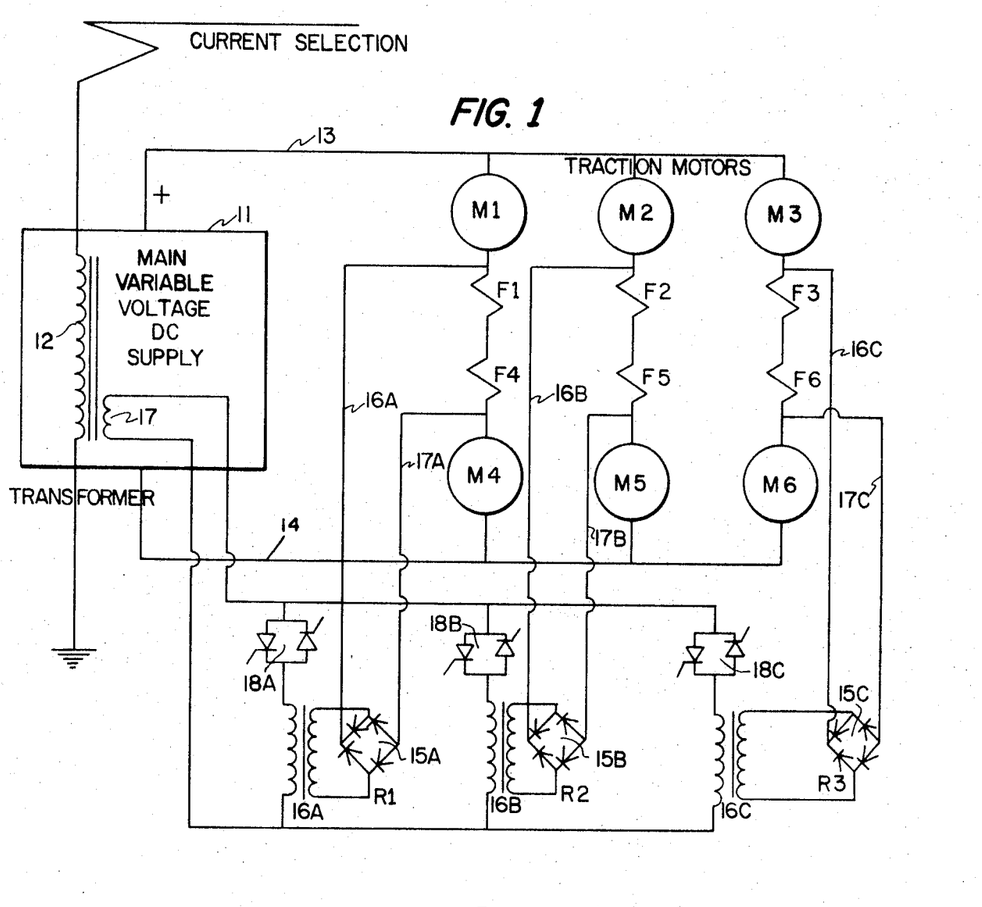
FIG. 1 is a schematic circuit diagram of one form of a new and improved wheel slip control system according to the invention for use with three sets of two series connected series type direct current traction motors with the three sets being connected in parallel circuit relationship.

The wheel slip control system shown in FIG. 1 is designed for use with a plurality of series type direct current traction motors having three sets of two series connected series type traction motors supplied from a variable voltage, direct current main power supply 11 that in turn is excited from a third rail or overhead alternating current supply through an input transformer whose primary winding is shown at 12. The three sets of two series connected series type direct current traction motors are connected in parallel circuit relationship across a pair of main direct current power supply terminals 13 and 14. Each of the series connected branches is comprised by two series connected DC traction motors with the first branch being comprised by the armature M1 and series connected field winding F1 connected in series circuit relationship with the field winding F4 and the armature of traction motor M4. Similarly, motors M2 and M5 and motors M3 and M6 comprise the other two sets of series connected series type traction motors.

In the arrangement shown in FIG. 1, wheel slip control of the traction motors is provided for each set of two series connected series type motors in each of the parallel branches from an auxiliary source of direct current comprised by a bridge rectifier network 15A, 15B and 15C. The bridge networks 15A–15C are connected by means of conductors 16 and 17 across the respective pairs of series connected field windings F1–F4, F2–F5 and F3–F6, respectively. The polarity of the connection is such that direct current supplied from the rectifier bridges 15A–15C is supplied to the respective pairs of series connected field winding F1–F4, F2–F5, and F3–F6, in aiding relationship. That is to say the auxiliary DC current from rectifiers 15A–15C is added to the normal excitation current supplied to the respective pairs of series connected field windings from the normal DC excitation source comprised by main power supply terminals 13 and 14 and the main DC voltage supply 11.

The respective bridge rectifiers 15A – 15C are supplied from respective low voltage transformers 16A, 16B and 16C connected in parallel circuit relationship across a low voltage secondary winding 17 coupled to the main supply transformer primary winding 12. The primary windings of the auxiliary supply transformers 16A – 16c are connected across the secondary supply winding 17 thrugh the medium of a set of back-to-back, reverse polarity, parallel connected thyristor devices 18A, 18B and 18C, respectively, which preferably comprise silicon controlled rectifiers. The thyristor devices 18A – 18C have their control gates connected to the output from a suitable wheel slip detector means, as will be explained more fully hereinafter in connection with FIG. 2, so that upon the occurrence of wheel slip in any of the traction motors, the thyristor device associated with the motor involved is turned-on and rendered conductive. Normally, however, the thyristor devices 18A – 18C are maintained in a non-conducting, current blocking condition so that normally no voltage is supplied through the auxiliary supply transformers 16A – 16C to their respective rectifier bridges 15A – 15C. Hence rectifiers 15A–15C normally emain in a non-conducting, current blocking condition until a wheel slip condition is detected and its associated thyristor device turned on. Accordingly, it will be appreciated that during normal operation, the traction motors M1 – M6 are operating as conventional series type direct current traction motors. If however, wheel slip occurs on any one of the axles, then an automatic wheel slip detection means (one specific form of which is to be described with respect to FIG. 2) operates to turn on one of the sets of thyristors 18A–18C associated with the set of motors on which the wheel slip occurs. Assuming that the wheel slip occured on motor M1, then the thyristors 18A would be turned on so that the rectifier 15A supplies auxiliary direct current in aiding relationship through the series connected field windings F1 and F4 in parallel with and in addition to the normal direct current excitation supplied from the main supply buses 13 and 14.

Figure 3:
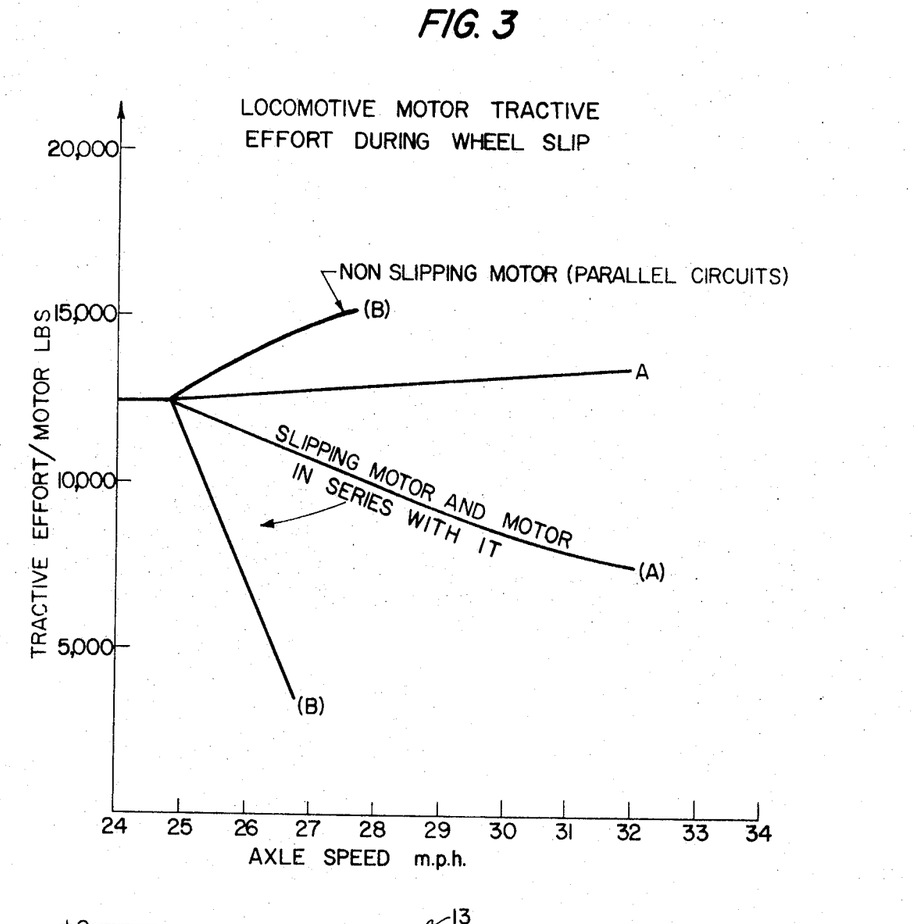
FIG. 3 illustrates a set of traction motor operating characteristic curves illustrating the speed versus tractive effort characteristics of direct current traction motors.

FIG. 3 of the drawings is a series of characteristic curves labeled locomotive motor tractive efforts during wheel slip and are illustrative of the action that occurs in a typical case when the wheels of an electrically driven locomotive slip. The lower curve A shows that as the motor speeds up (starting from an assumed current of 1150 amps. and speed condition of 24 mph.) that the tractive effort falls off rather slowly. It has been demonstrated from experience that this fall off in the tractive effort is too slow a decrease in order to arrest wheel slip if it occurs. However, if the value of the auxiliary current supplied to the traction motor fields is adjusted so that the field current is maintained at the same value which it was just before the slipping started, then the lower curve B would be obtained. From an examination of this curve it will be appreciated that theere is a much more rapid falling off of the tractive effort, and one which would allow the wheel slip to correct itself before the slipping velocity becomes excessive. If too great a slipping velocity is allowed, then the inertia effects in the motor are such that the wheel slip tends to continue and cannot easily be corrected except be extreme reductions in tractive effort. The upper curves A and B illustrate the characteristics expected for non-slipping traction motors. It might be noted that the characteristic illustrated by the lower curve B is similar to that obtained with a separately excited DC traction motor wherein the field winding of the motor is shunt connected to a constant DC supply.

Figure 2:
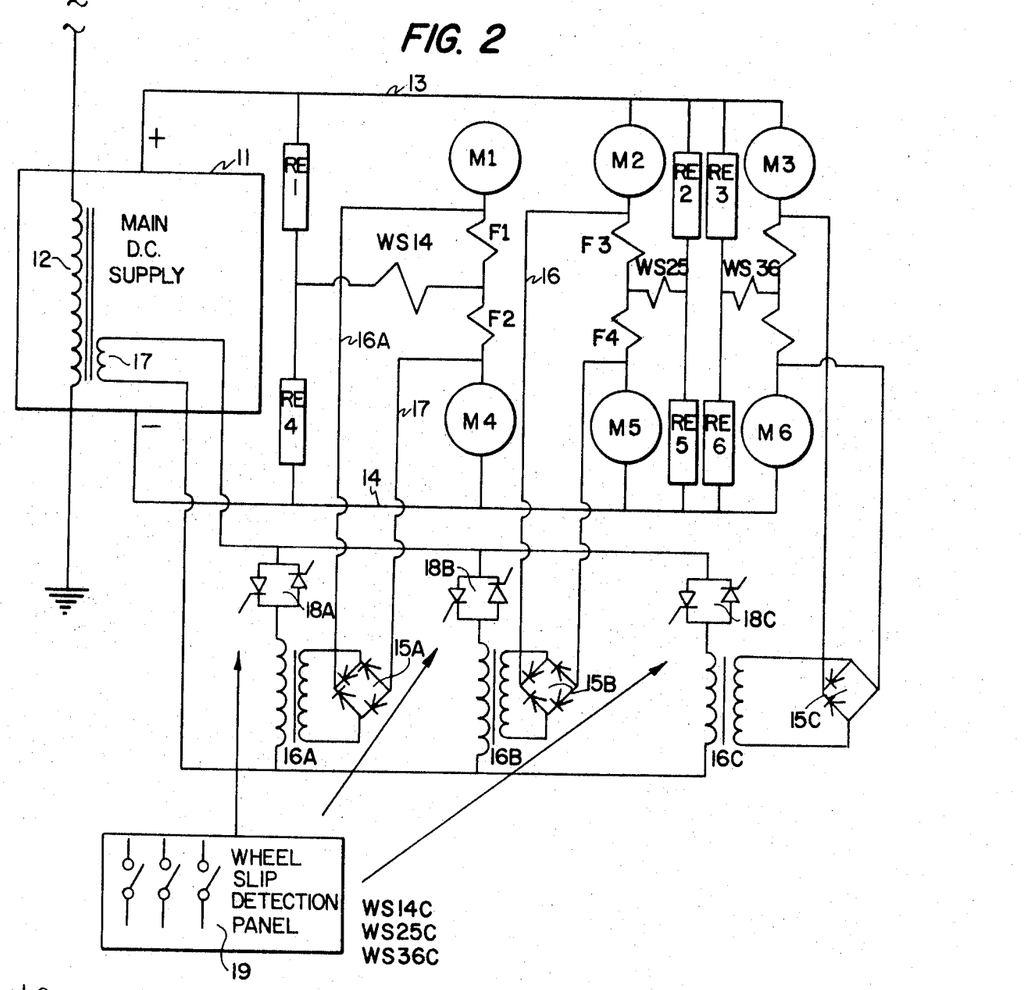
FIG. 2 is a schematic circuit diagram of a wheel slip control system similar to that shown in FIG. 1 but in addition shows certain details of one form of a wheel slippage detector for use in the system.

FIG. 2 of the drawings is a schematic circuit diagram of the complete system of FIG. 1 and alos shows one form of a suitable wheel detection means. The wheel slip detection means shown in FIG. 2 operates by measuring the voltage at the mid-point between the two series connected series type traction motors of each set of three parallel connected sets of motors, and compares this voltage to half the line voltage supplied across power supply terminals 13 and 14 to the motors. For this purpose three sets of voltage dividing resisotrs are provided across the power supply terminals and are comprised by series connected resistors RE1 and RE4 for use with traction motors M1 and M4, voltage dividing resistors RE2 and RE5 for traction motors M2 and M5, and voltage dividing resistors RE3 and RE6 for traction motors M3 and M6. Each of these sets of voltage dividing resistors has its mid-point connected through the solenoid winding WS14, WS25, and WS36, respectively, of sensitive relays to the mid-point of the respective traction motors M1 – M4, M2 – M5, and M3 – M6, respectively. A wheel slip detection panel is shown at 19 and includes the movable contacts WS14C, WS25C and WS36C which are selectively closed upon the respective relay windings WS14, WS25 or WS36 being actuated due to an imbalance in the bridge circuit in which it is connected. From an examination of FIG. 2, it will be appreciated that the resistors RE1, RE4 and traction motors M1, F1 and F2M4 comprise a balanced measuring bridge which is maintained in a balanced condition for so long as operating conditions of the motors M1 and M4 are maintained normal, for example. Similarily, the remaining two sets of traction motors form respective measuring bridges with their associated voltage dividing resistors and relay pickup windings. If, for example, either motor M1 or M4 slips, the voltage across this motor will increase due to increased back EMF in the armature and will cause an unbalance in the measuring bridge in which it is included. This unbalance will produce a current flow through the relay pickup winding WS14 causing its associated contact WS14C in the wheel slip detection panel 19 to be closed. This, in turn, supplies gating potential to the control gates of the thyristors 18A which are turned on and maintained in a conducting condition for so long as the contacts WS14C remain closed. Turn on of the thyristors 18A then results in the provision of the auxiliary wheel slip control current supplied from rectifier 15A thrrough the field windings F1 and F2 in the manner described above with relation to FIG. 1.

Figure 4A:
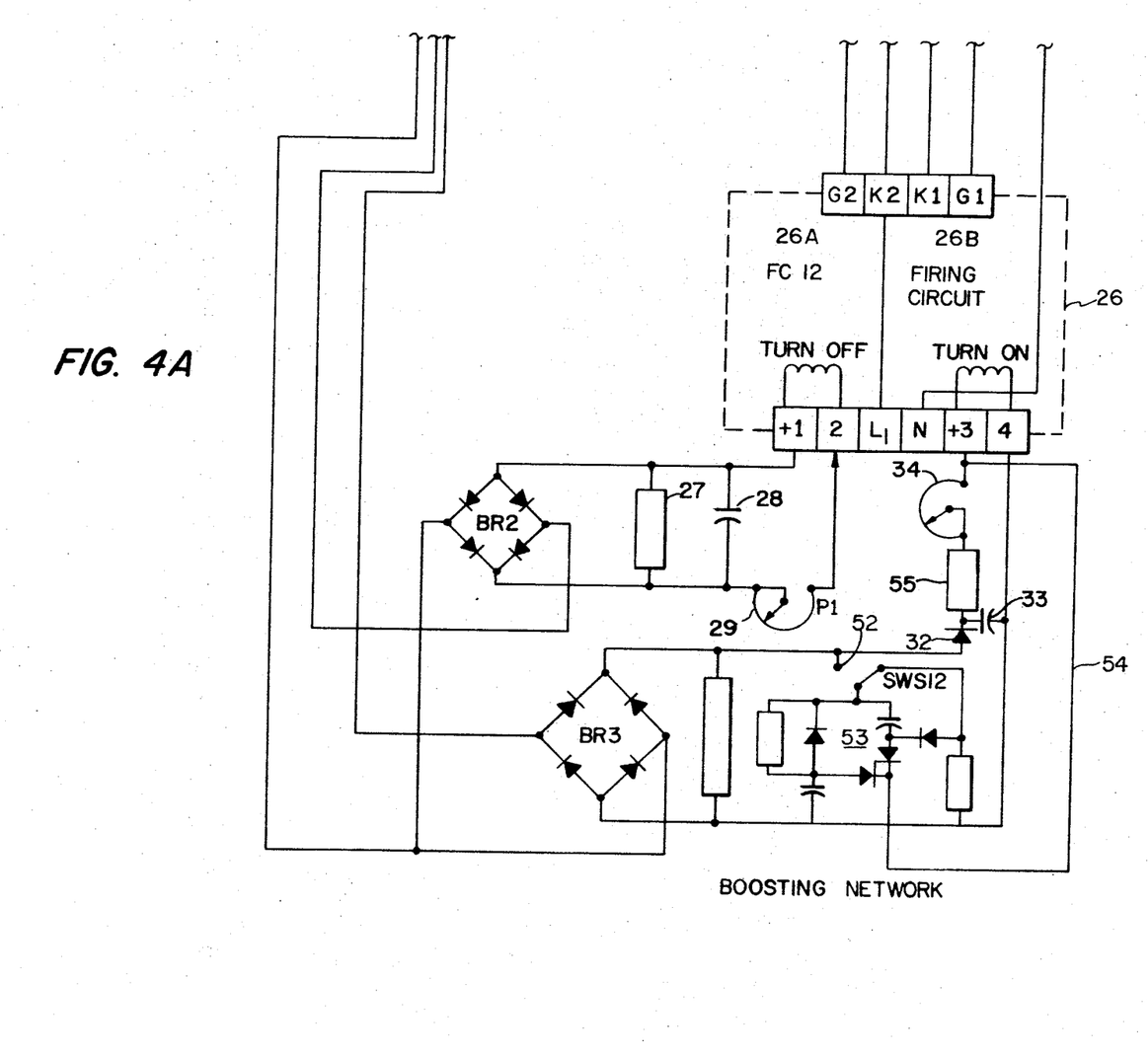
FIG. 4a and 4b are detailed circuit diagrams of a preferred form of wheel slip control system constructed in accordance with the invention.
Figure 4B:
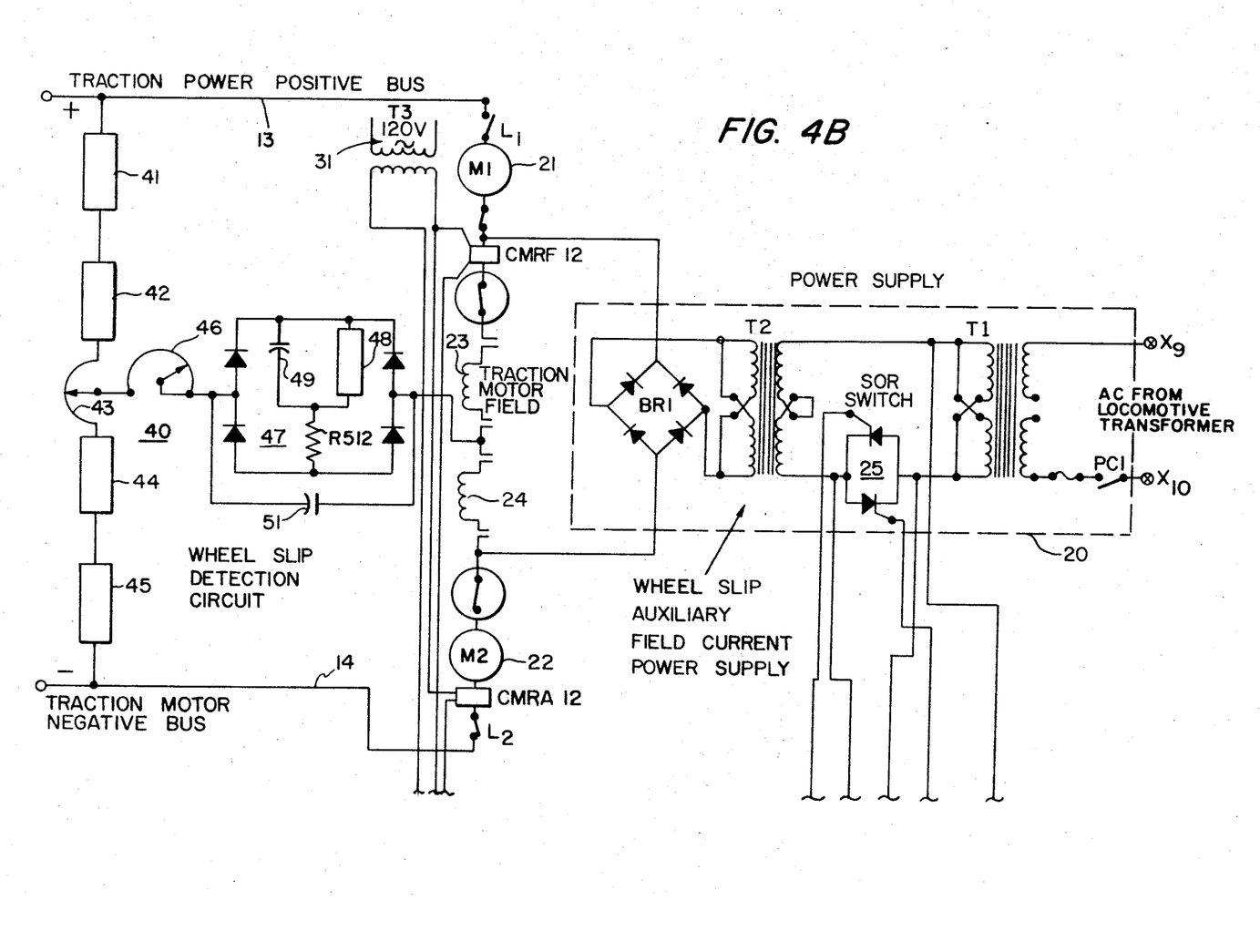

FIGS. 4A and 4B considered together comprise detailed circuit diagram of a preferred form of wheel slip control system constructed in accordance with the invention. In FIG. 4B, a pair of series wound, direct current traction motors shown at 21 and 22 are connected through line contactors L1 and L2 across a pair of direct current traction motor power supply buses 13 and 14. The traction motors 21 and 22 are connected in series circuit relationship with suitable safety and control interlock switching contacts, reversing switch contacts and the like normally included in traction motor control system (but not comprising a part of this invention) together with a first current measuring reactor CMRF12, the field winding 23 of traction motor 21, the field winding 24 of traction motor 22 and a second current measuring reactor CMRA12. The series circuit thus comprised is connected across the power supply buses 13 and 14 through the line contactors L1 and L2. The purpose of the current measuring reactors CMRF12 and CMRA12 will be described more fully hereinafter.

In addition to the normal direct current excitation source described above for the field windings 23 and 24, these two windings are connected in series circuit relationship with the current measuring reactor CMRF12 across the output of a bridge rectifier BR1 that comprises a part of a wheel slip auxiliary field current power supply 20. Bridge rectifier BR1 is supplied from a second stage voltage step-down transformer T2 that in turn is supplied from a first stage voltage step-down transformer T1 through a phase control circuit 25. The first stage voltage step-down transformer T1 has its primary windings supplied from a 500 volt alternating current power source normally available on alternating current powered electric locomotives and obtained from a suitable power supply transformer. The two-stage step-down transformers T1 and T2 together with pahse control circuit 25 and rectifying bridge BR1 form a wheel slip auxiliary field current power supply 20 for supplying auxiliary DC current to the field windings 23 and 24 in series in the same manner described above with respect to the species of the invention shown in FIGS. 1 and 2. The polarity of the auxiliary DC current supplied from bridge BR1 is such that it is in aiding relation (added to) the normal DC excitation current supplied to the field windings 23 and 24 from the traction motor power supply buses 13 and 14.

The phase control circuit 25 is comprised by a pair of back-to-back, reverse polarity, parallel connected silicon control rectifier thyristor devices having their load terminals connected in the power supply connection intermediate the first and second stage transformers T1 and T2. The control gate of the silicon control rectifier thyristors is connected to the output of a gating circuit 26 shown in FIG. 4A having a first section 26A designed to maintain the thyristors 25 in an off (current blocking) condition and a second section 26B for supplying a gating-on signal to the control gates of the thyristors. The gating control circuit 26 is a conventional commerically available gating control circuit for silicon control rectifiers such as that manufactured and sold by the Crydom Controls Division of International Rectifier Company, Santa Anna, California, and described in their bulletin No. 2.20 The turn-off section 26A of gating circuit 26 is supplied from a fast responding gating network comprised by a rectifier bridge BR2, a smoothing filter formed by resistor 27 and capacitor 28 and a gain adjusting resistor 29. This fast responding, turn-off gating network in turn is supplied from an auxiliary 120 volt alternating current supply shown at 31 through the auxiliary supply transformer $T_3$ having its secondary winding connected through the current measuring reactor CMRF12 across the rectifier bridge BR2.

The turn-on section 26B of the gating circuit 26 is connected to a slow responding gating network comprised by a rectifier bridge BR3, a delay network comprised by a diode 32 and a capacitor 33 and a gain adjusting resistor 34. The rectifier bridge BR3 is supplied from the auxiliary source of alternating current through the second current measuring reactor CMRA12. Because of their respective locations. it will be appreciated that the current measuring reactor CMRF12 measures the total field current flowing the series connected field windings 23 and 24 while the field reactor CMRA12 measures the armature current flowing through the series connected series type traction motors. The current measuring reactor CMRF12 and CMRA12 are conventional, commercially available current sensing reactors such as the model TD-4303 currnetsensing reactor manufactured and sold by Magnetics Incorporated.

By reason of the above connections, during operation the output of the current measuring reactor CMRF12 is rectified by bridge rectifier BR2, filtered by capacitor 28 and adjusted by variable resistor 29 and then supplied to the turn-off winding of the turn-off section 26A of gating curcuit 26. The output of the current measuring reactor CMRA12 is rectified by bridge rectifier BR3, filtered by capacitor 43 and adjusted with variable resistor 34 to supply a turn-on signal to the turn-on winding of the turn-on section 26B of gating circuit 26. Because of the value of capacitor 33 and diode 32, the signal from CMRA12 lags the instantaneous value of the traction motor armature current.

During normal operation of the series connected traction motors 21 and 22, the parameters of the circuit are ajdusted to provide a slight excess of turn-off current to turn-off section 26A, and the auxiliary field current power supply 20 does not supply auxiliary current to the field windings 23 and 24. As soon as a wheel slip occurs, the armature and field current of the slipping motor will decrease by the same amount due to increased back EMF. Because of the lag in the slow responding tunr-on circuit which acts as a memory, the turn-on signal will then suddenly become larger than the turn-off signal, and the wheel slip auxiliary field power supply 20 will then start to feed additional current into the field windings 23 and 24 of the traction motors. The increase of field current will then cause further increases of traction motor back EMF which in turn reduces sharply the armature current and the slipping motor torque.

In this arrangement, it will be appreciated therefore that the current measuring reactor CMRF12 and CMRA12 in conjunction with the memory provided by delay circuit 32, 33 in effect serve as a wheel slip detecting means.

If the above described instantaneous wheel slip correction is not sufficient to correct the slip, additional slip control is provided by a wheel slip detection circuit shown generally at 40. This wheel slip detection circuit is comprised by a set of series connected voltage dividing resistors 41 through 45. The series connected voltage dividing resistors 41 – 45 are connected resistor 43 power supply terminals 13 and 14 and the middle voltage dividing resistor 43 is adjustible to provide a means for ajdusting the balance of the bridge of which the resistors comprise a part. The adjustible tap point of resistor 43 is connected through a second variable resistor 46 and diode rectifier bridge 47 to the mid-connection point of the series connected field windings 23 and 24 of series traction motors 21 and 22. The diode bridge 47 has a relay winding RS12 connected across a set of diagonally opposed terminals through a resistor and capacitor 48 and 49. Capacitor 49 is a "rate" capacitor whose purpose is to offer a low impedance path to the relay in case of high acceleration, hence, high dv/dt of the mid point voltage during wheel slip. This capacitor is connected across resistor 48 whose purpose is to determine, in conjunction with rheostat 46, the sensitivity of the relay RS12 to detecting wheel slip. A smoothing capacitor 51 is is connected across the remaining diagonally opposite terminals of the bridge toeliminate high frequency electrical "noise".

The relay winding RS12 upon actuation will close a movable switch contact SWS12 from its position shown to the left hand terminal 52 thereby connecting a booster network 53 directly in circuit relationship through the conductor 54 to the turn-on section 26B of gating circuit 26. Closure of SWS12 on the contact 52 in effect by-passes the delay network 32, 33, the gain adjusting resistor 34 and a large voltage dropping resistor 55 so as to supply a relatively large value turn-on signal to the turn-on section 26B for so long as relay RS12 remains actuated.

If the reduction of motor torque produced by the above-described operation of the slow responding gating network is not sufficient to correct the slip, the continued slipping condition will produce an imbalance in the measuring bridge 47 which results in current flow through the actuating winding RS12. This, in turn, results in switching contact SWS12 onto fixed contact 52 thereby maintaining the turn-on section 26B of gating circuit 26 turned on and in addition, increases the magneitude of the turn-on signal. This increase results in an increase in the magnitude of the auxiliary DC current supplied by bridge rectifier BR1 to the field windings 23 and 24 due to its effect on the phase control circuit 25. As a result, the slipping motor torque is further decreased until the slip stops. Upon this occurrence, balanced conditions are restored to the measuring bridge 40, and relay RS12 drops out thereby turning off gating circuit 26 and restoring the control system to its normal operating condition.

Figure 5:
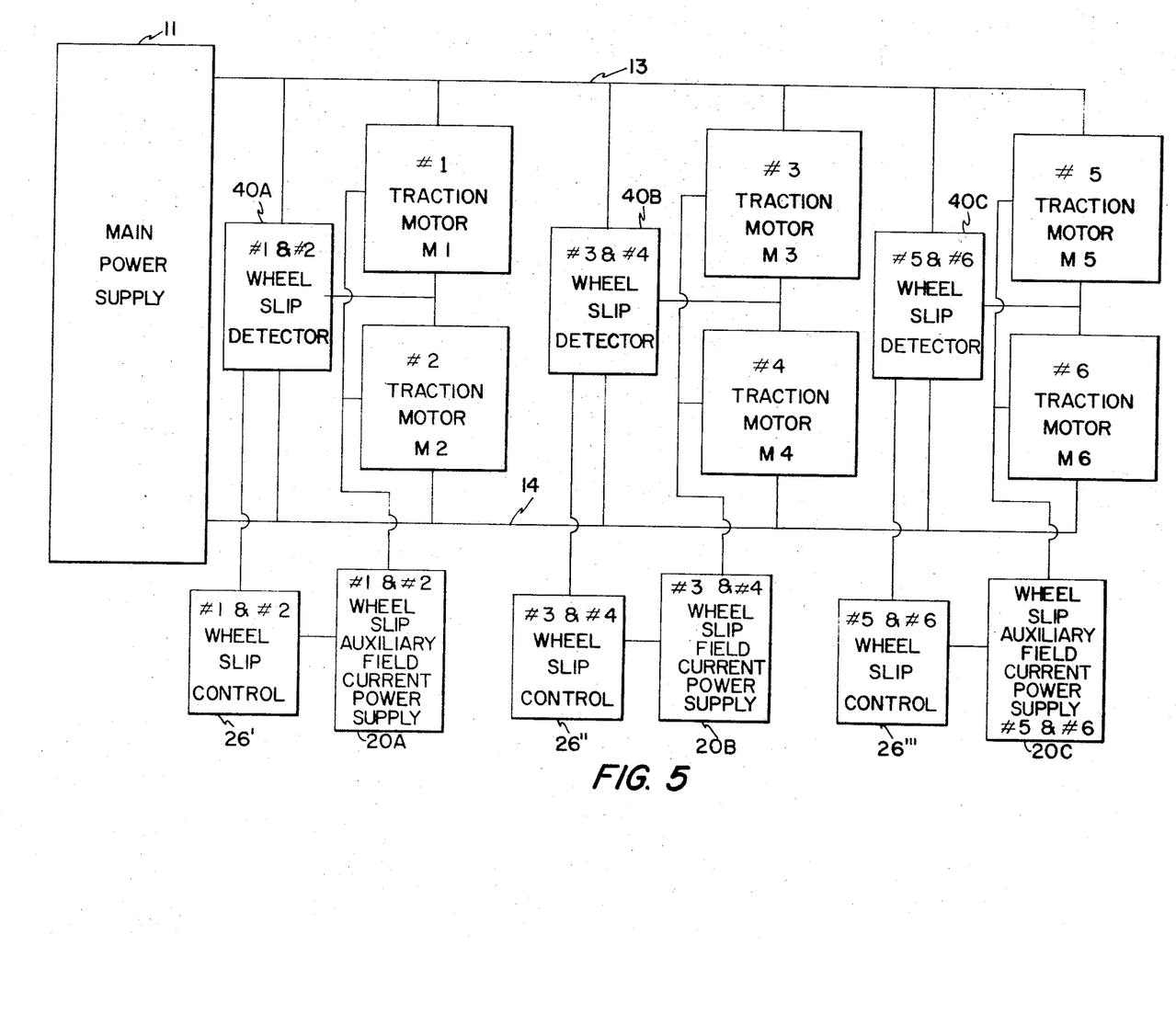
FIG. 5 is a functional block diagram of a complete wheel slip control system for an electrically driven vehicle such as a locomotive employing six traction motors connected in three parallel sets of two series connected series type traction motors.

FIG. 5 of the drawings is a functional block diagram of a complete wheel slip control system for six traction motors wherein there are three sets of two series connected series type direct current traction motors. In the system shown in FIG. 5 each set of two series connected series type traction motors is provided with its own wheel slip detector, wheel slip control and wheel slip auxiliary field current power supply. For example, the number 1 and 2 traction motors M1 and M2 are provided with a wheel slip detector 40A which is simliar in construction to the wheel slip detection curcuit 40 shown in FIG. 4B, a wheel slip control circuit 26' which is similar to the wheel slip control circuit 26 together with its associated fast responding gating network BR2, 27 and 28 and slow resonding gating network 32, 33, 34 and 53 shown in FIG. 4. The wheel slip control 26' controls operation of the wheel slip auxiliary field current power supply 20A which is similar to the wheel slip auxiliary field current supply circuit 20 shown in FIG. 4B and is connected across both series field windings of the traction motors M1 and M2. In a similar manner, the wheel slip detector 40B, wheel slip control 26'' and wheel slip field current power supply 20B provides wheel slip control for the traction motors M3 and M4, and wheel slip detector 40C, wheel slip control 26''' and wheel slip auxiliary field current power supply 20C provides wheel slip control for the set of series connected traction motors M5 and M6. In operation, the sets of series connected traction motors will be provided with wheel slip control in substantially the same manner as was described in connection with FIGS. 4A and 4B of the drawings.

Figure 6:
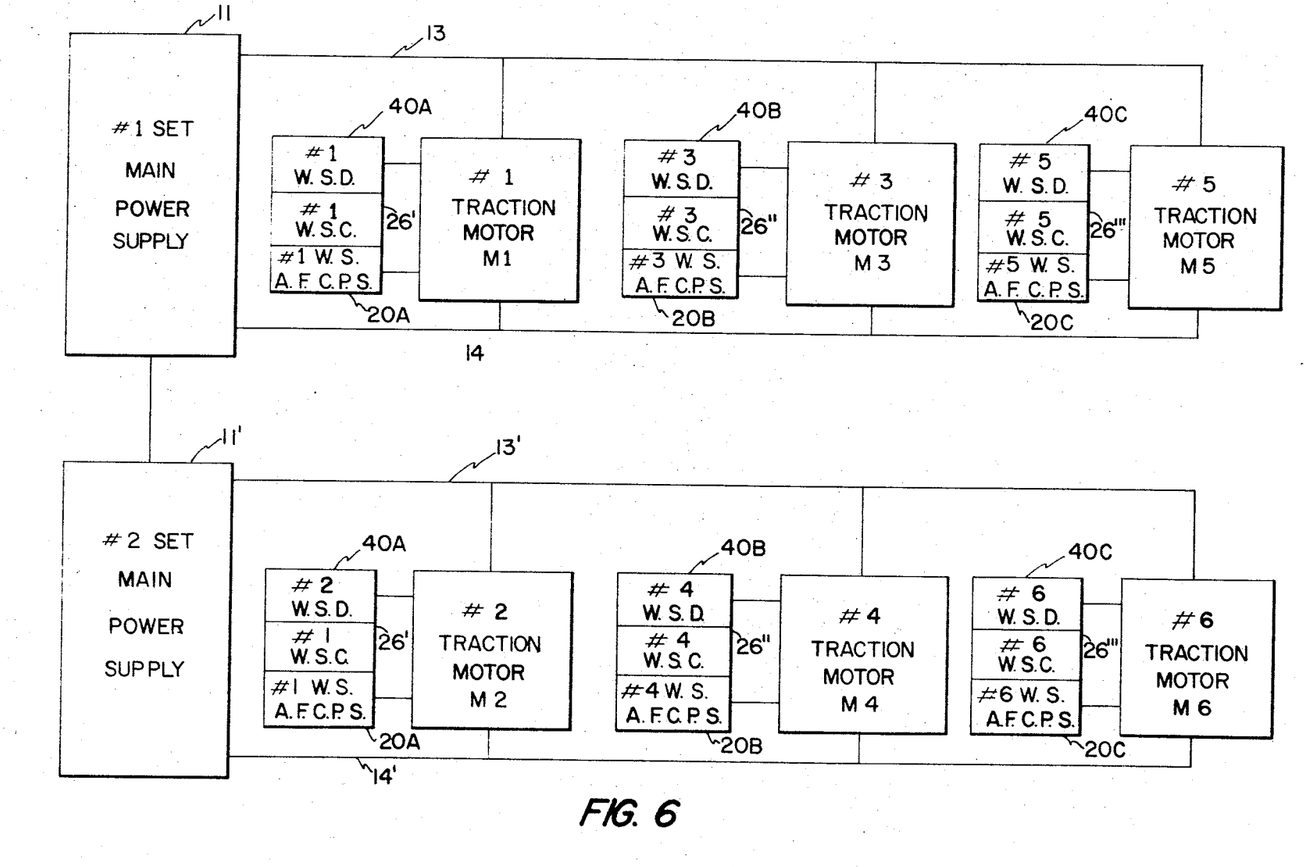
FIG. 6 is a functional block diagram of a complete wheel control system wherein six traction motors are all connected in parallel circuit relationship in two sets of three motors.

FIG. 6 is a functional block diagram of an overall wheel slip control system wherein each of the traction motors of the electrically driven vehicle is individually connected in parallel circuit relationship across one of two sets of main power supply buses 13, 14 and 13', 14'. In this arrangement, each individual traction motor is provided with its associated wheel slip detector, wheel slip control and wheel slip auxiliary field current power supply all of which are constructed in the same manner as the corresponding elements described with relation to FIGS. 4A and 4B of the drawings and operate in a similar fashion. The only difference with respect to the arrangement shown in FIG. 6 is that the wheel slip auxiliary field current power supply is connected across only a single series field winding of the traction motor with which it is associated. Otherwise, construction and operation is entirely similar to that described with respect to FIG. 4B.

Figure 7:
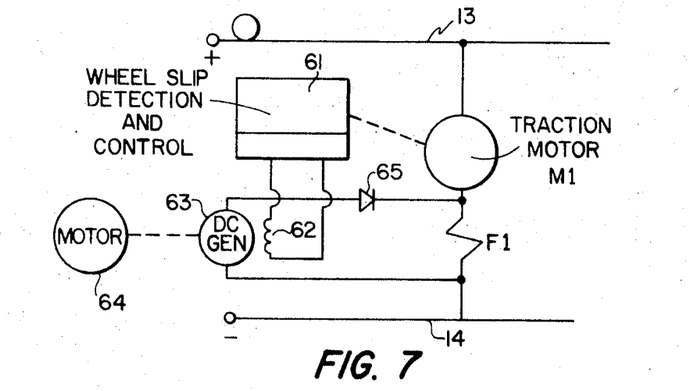
FIG. 7 is a schematic circuit diagram of an alternative form of circuit for supplying the auxiliary wheel slip correction current from a motor operated direct current generator set.

FIG. 7 of the drawings is a schematic circuit diagram of a different technique for generating and controlling the auxiliary direct current supplied to the field winding $F_1$ of a traction motor M1 for slip control purposes. In the arrangement of FIG. 7, a suitable wheel slip detection and control circuit 61 is coupled to the traction motor M1 for sensing a slipping condition. The wheel slip detection and control circuit 61 may be similar to that described with reference to FIGS. 2 and 4 or alternatively, may be any known form with reference to FIGS. 2 and 4 or alternatively, may be any known form of wheel slip detection circuit capable of detecting slipping of any axle individually, such as the tachometer type wheel slip detection circuit described and claimed in U. S. Pat. No. 3,210,630-Zelina-issued Oct. 5, 1965 for a plural motor drive with differential synchronous slip control, or some other known arrangement such as the armature current comparision system describedin U. S. Pat. No. 2,543,622. In this arrangement, the wheel slip detection and control circuit 61 supplies its output to control the excitation of the field winding 62 of a motor driven direct current generator set 63 that is shafted to and driven by a motor 64. Motor 64 may comprise an internal combustion engine, another electric motor, etc., for driving the rotor of DC generator 63 at substantially constant speed. With the arrangement shown in FIG. 7, upon a wheel slip condition being detected, the wheel slip detection and and control circuit 61 supplies an exciting field current to the field winding 62. This results in the generation of an output direct current from DC generator 63 that is supplied through blocking diode 65 across the field winding $F_1$ of the series type traction motor M1. The polarity of the current of DC generator 63 is such that it adds to the field current of traction motor M1 so as to decrease its tractive effort as described previously. Diode 65 is used to isolate generator 63 from field winding $F_1$ in the event of power supply transients.

Figure 8:
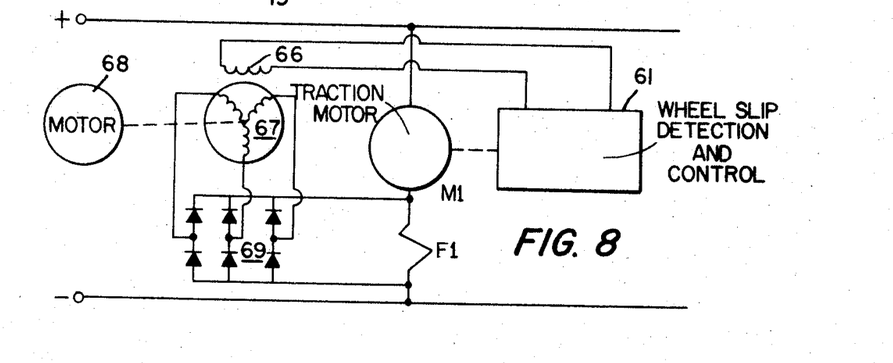
FIG. 8 is a schematic circuit diagram of still another arrangement for supplying the auxiliary wheel slip correcting current from a motor driven alternator set through a rectifying bridge arrangement.

FIG. 8 is a schematic circuit diagram of still another approach to supplying the auxiliary direct current applied to the field winding $F_1$ of a traction motor $M_1$ to correct slippage in accordance with the invention. In the arrangement shown in FIG. 8, the wheel slip detection and control circuit 61 which senses a slipping condition of the traction motor M1 has its output fed back to control the excitation of the field winding 66 of a motor driven alternator 67 that is mechanically shafted to and driven by a motor 68. Alternator 67 has its armature windings connected across a three phase rectifier bridge 69 that in turn is connected across the field winding $F_1$ of the series type traction motor M1. In operation, the alternator 67 which is driven at a constant speed by motor 68 normally is not excited so that no output is supplied to the rectifier bridge 69. Upon detection of a slippage condition, wheel slip detection control circuit 61 will excite the field winding 66 of alternator 67 and result in the production of a three phase alternating current output voltage that is rectified by rectifier 69 and applied across field winding $F_1$ for wheel slip correction purposes.

Figure 9:
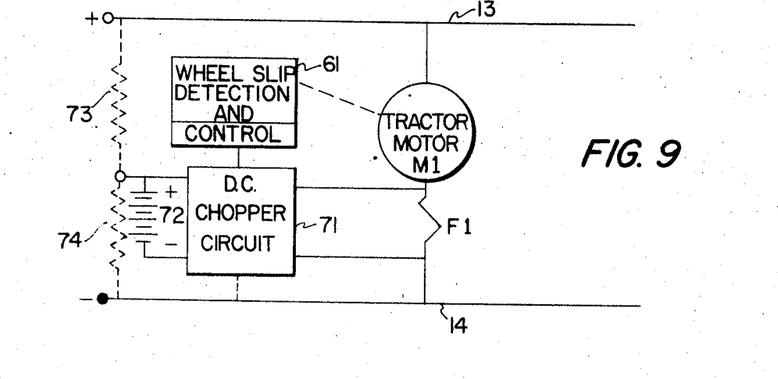
FIG. 9 is a schematic circuit diagram of still a further arrangement wherein the auxiliary wheel slip correcting is supplied through a DC chopper circuit from a battery, voltage divider or other readily available source of direct current.

FIG. 9 is a schematic circuit diagram of still another form of wheel slip control system constructed in accordance with this invention. In the arrangement of FIG. 9, the wheel slip detection and control circuit 61 has its output connected to and controlling the operation of a conventional direct current chopper circuit 71. The direct current chopper circuit 71 is a conventional, commercially available direct current to direct current chopper inverter circuit of the type described in the Silicon Control Rectifier Manual published by the General Electric Company-Semiconductor Products Division. The DC chopper circuit 71 may be excited from a battery source of direct current shown at 72, or alternatively, can receive its excitation from a suitable voltage divider network such as that shown in phantom at 73 and 74, or some other source of direct current such as a motor driven direct current generator set. The DC chopper circuit 71 under normal operating conditions of the traction motor M1 will block any application of the direct current voltage from battery 72 or other source from the series connected field winding $F_1$ of the traction motor M1. However, upon a slippage condition being detected by the wheel slip detection and control circuit 61, the DC chopper circuit 71 is rendered operative to supply to the field winding $F_1$ an auxiliary DC current which adds to the normal series connected DC excitation current supplied over terminal buses 13 and 14. By appropriately controlling the DC chopper circuit, the magnetiude of the added current can be controlled in accordance with well known time ratio control principles and as required in order to correct the slippage condition in the manner described with respect to previously discussed embodkments of the invention.

From the foregoing description, it will be appreciated that the invention provides a new and improved wheel slip control system for electric traction motor drives employing series type direct current traction motors for controlling slippage of such series type traction motors. The new and improved control system provides for selective reduction in the tractive effort of any one of a plurality of series type direct current traction motors in order to overcome slippage of an individual motor without requiring that the tractive effort of non-slipping motors be reduced. The system is rendered operative by first detecting a wheel slippage condition. For this purpose any known form of wheel slip detection means can be employed such as the unbalanced measuring bridge arrangement shown in FIG. 2 and or FIG. 4, a tachometer feedback arrangement such as described in U. S. Pat. No. 3,210,630, an armature current comparision Scheme such as that described in U. S. Pat. No. 2,543,622, or any other suitable known form of wheel slippage detecting means. Likewise, the auxiliary source of direct current, the manner of its connection, and the wheel slip control means may take any suitable known form capable of carrying out the objective of the invention as described above.

Having described several embodiments of a new and improved wheel slip control system constructed in accordance with the invention, it is believed obvious that other modifications and variations of the invention will be suggested to those skilled in the art in the light of the above teachings. It is therefore to be understood that changes may be made in the particular embodiments of the invention desdribed which are within the full intended scope of the invention as defined by the appended claims.

What is claimed is:

1. A wheel slip control system for electric traction motor drives employing series type direct current traction motors having the field and armature windings connected in series electrical circuit relationship, the improvement comprising wheel slippage detecting means for detecting slippage of a series type direct current traction motor and deriving an output indication of any slippage, an auxiliary source of direct current connectable to the series connected field-armature circuit of the series type traction motor in parallel with and in addition to the normal direct current excitation supply for the traction motor, the polarity of the auxiliary source of direct current being such that when added to the normal excitation direct current results in a reduction of the armature current with a consequent reduction in the tractive effort of the traction motor, and wheel slip control means responsive to the wheel slippage detecting means and coupled to control the output of the auxiliary source of direct current to the field-armature circuit of the series type traction motor, and the auxiliary direct current source comprises rectifying means connected to the series connected field-armature circuit of the series type traction motor, a source of alternating current, and phase control circuit means connected to and supplying said rectifying means and supplied from said alternating current source, and said wheel slip control means comprising phase control gating circuit means responsive to the wheel slippage detecting means and controlling the operation of the phase control circuit means for controlling the supply of alternating current to the rectifying means.

2. A wheel slip control system according to claim 1 wherein the phase control gating circuit means includes fast and slow responding circuit means responsive to normal armature current flow through the traction motor for normally maintaining the phase control circuit means in an off-condition, and responsive to a slippage condition for turning-on the phase control circuit means in a fast responding manner to thereby supply corrective current through the rectifying means to the field-armature circuit of the traction motor for quickly reducing the tractive effort of the traction motor in response to a slippage condition.

3. A wheel slip control system according to claim 2 wherein the wheel slippage detecting means comprises bridge measurement circuit means connected in circuit relationship with the field-armature circuit of the series type traction motor for detecting any unbalanced condition due to the occurrence of slippage and for deriving a turn-on electric signal that is supplied to the phase control gating means for maintaining the phase control circuit means in an on-condition for so long as slippage continues and the measurement bridge remains in an unbalanced state.

4. A wheel slip control system according to claim 3 wherein the auxiliary source of direct current is connected across the field winding of the traction motor with a polarity such that the auxiliary direct current adds to the normal excitation direct current supplied to the field winding.

5. A wheel slip control system according to claim 4 wherein there are a plurality of series type traction motors connected in series-parallel circuit relationship across a direct current excitation source with a set of at least two series type traction motors being connected in series circuit relationship in each parallel path and with the auxiliary source of direct current being connected in aiding relationship across the field windings of all the series connected series type traction motors in a set.

6. A wheel slip control system according to claim 4 wherein there are a plurality of series type traction motors connected in parallel circuit relationship across a direct current excitation source and with a respective auxiliary source of direct current being connected across the field windings of each of the series type traction motors, respectively.

7. A wheel slip control system according to claim 1 wherein the wheel slippage detecting means comprises bridge measurement circuit means connected in circuit relationship with the field-armature circuit of the series type traction motor for detecting any unbalance condition due to the occurrence of slippage and for deriving a turn-on electric signal that is supplied to the phase control gating means for maintaining the phase control circuit means in an on-condition for so long as slippage continues and the measurement bridge remains in an unbalanced state.

8. A wheel slip control system for electric tracton motor drives employing series type direct current traction motors having the field and armature windings connected in series electrical circuit relationship, the improvement comprising wheel slippage detecting means for detecting slippage of a series type direct current traction motor and deriving an output indication of any slippage, an auxiliary source of direct current connectable to the series connected field-armature circuit of the series type traction motor in parallel with and in addition to the normal direct current excitation supply for the traction motor, the polarity of the auxiliary source of direct current being such that when added to the normal excitation direct current results in a reduction of the armature current with a consequent reduction in the tractive effort of the traction motor, and wheel slip control means responsive to the wheel slippage detecting means and coupled to control the output of the auxiliary source of circuit current to the field-armature circuit of the series type traction motor, and the auxiliary DC source is connected to the series type traction motor field-armature circuit through thyristor devices of the silicon control rectifier type having gating means connected to and controlled by the output from the wheel slippage detecting means.

9. A wheel slip control system according to claim 8 wherein the auxiliary direct current source comprises rectifier circuit means connected across the field windings of the series type traction motor, and an auxiliary source of alternating current is connected to and supplies the rectifying circuit means under the control of the thyristor device.

10. A wheel slip control system for electric traction motor drives employing series type direct current traction motors having the field and armature windings connected in series electrical circuit relationship, the improvement comprising wheel slippage detecting means for detecting slippage of a series type direct current traction motor and deriving an output indication of any slippage, an auxiliary source of direct current connectable to the series connected field-armature circuit of the series type traction motor in parallel with and in addition to the normal direct current excitation supply for the traction motor, the polarity of the axuiliary source of direct current being such that when added to the normal excitation direct current results in a reduction of the armature current with a consequent reduction in the tractive effort of the traction motor, and wheel slip control means responsive to the wheel slippage detecting means and coupled to control the output of the auxiliary source of direct current to the field-armature circuit of the series type traction motor, and the auxiliary source of direct current comprises a motor driven direct current generator having its armature circuit connnected through a unidirectional conducting device across the field winding of the series type direct current traction motor with the field winding of the motor driven direct current generator being connected to and controlled by the output from the wheel slip control means.

11. A wheel slip control system for electric traction motor drives employing series type direct current traction motors having the field and armature windings connected in series electrical circuit relationship, the improvement comprising wheel slippage detecting means for detecting slippage of a series type direct current traction motor and deriving an output indication of any slippage, an auxiliary source of direct current connectable to the series connected field-armature circuit of the series type traction motor in parallel with and in addition to the normal direct current excitation supply for the traction motor, the polarity of the auxiliary source of direct current being such that when added to the normal excitation direct current results in a reduction of the armature current with a consequent reduction in the tractive effort of the traction motor, and wheel slip control means responsive to the wheel slippage detecting means and coupled to control the output of the auxiliary source of circuit current to the field-armature circuit of the series type traction motor, and the auxiliary source of direct current comprises rectifier bridge circuit means connected across the field winding of the series type traction motor and a motor driven alternator set with the armature winding of the motor driven alternator being connected to and supplying the rectifier bridge circuit means, the field winding of the motor driven alternator being connected to and controlled by the wheel slip control means.

12. A wheel slip control systm for electric traction motor drives employing series type direct current traction motors having the field and armature windings connected in series electrical circuit relationship, the improvement comprising wheel slippage detecting means for detecting slippage of a series type direct current traction motor and deriving an output indication of any slippage, an auxiliary source of direct current connectable to the series connected field-armature circuit of the series type traction motor in parallel with and in addition to the normal direct current excitation supply for the traction motor, the polarity of the auxiliary source of direct current being such that when added to the normal excitation direct current results in a reduction of the armature current with a consequent reduction in the tractive effort of the traction motor, and wheel slip control means responsive to the wheel slippage detecting means and coupled to control the output of the auxiliary source of circuit current to the field-armature circuit of the series type traction motor, and the auxiliary source of direct current comprises a battery, direct current voltage divider, and the like and direct current chopper circuit means connected to and supplied from the battery, direct current voltage divider and the like and having its output connected in aiding relation across the field winding of the series type direct current traction motor, said direct current chopper circuit means being connected to and controlled by the wheel slip control means.

* * * * *